(12) United States Patent
Cha et al.

(10) Patent No.: US 10,474,643 B2
(45) Date of Patent: Nov. 12, 2019

(54) DISTRIBUTED FILE SYSTEM AND METHOD OF CREATING FILES EFFECTIVELY

(71) Applicant: ELECTRONICS AND TELECOMMUNICATIONS RESEARCH INSTITUTE, Daejeon (KR)

(72) Inventors: Myung Hoon Cha, Daejeon (KR); Young Kyun Kim, Daejeon (KR); Hong Yeon Kim, Daejeon (KR); Wan Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 418 days.

(21) Appl. No.: 15/145,311

(22) Filed: May 3, 2016

(65) Prior Publication Data

US 2017/0193006 A1    Jul. 6, 2017

(30) Foreign Application Priority Data

Jan. 5, 2016    (KR) .................. 10-2016-0001055

(51) Int. Cl.
*G06F 16/182*    (2019.01)
*G06F 16/16*    (2019.01)

(52) U.S. Cl.
CPC .......... *G06F 16/182* (2019.01); *G06F 16/164* (2019.01)

(58) Field of Classification Search
CPC .......... G06F 17/30194; G06F 12/0864; G06F 16/164

(Continued)

(56) References Cited

U.S. PATENT DOCUMENTS

2003/0120879 A1    6/2003  Chen et al.
2010/0161657 A1    6/2010  Cha et al.
(Continued)

FOREIGN PATENT DOCUMENTS

KR    10-2003-0053030        6/2003
KR    10-2003-0053030 A      6/2003
(Continued)

OTHER PUBLICATIONS

KIPO Office Action dated Nov. 19, 2018 of the KR Patent Application No. 10-2016-0001055 corresponding to the above identified US Application.
(Continued)

*Primary Examiner* — Shahid A Alam
(74) *Attorney, Agent, or Firm* — LRK Patent Law Firm (57) ABSTRACT

A distributed file system includes metadata servers and data servers. The metadata server includes a selecting unit to select a data server from the data servers, a chunk allocation requesting unit to request that the selected data server perform chunk allocation, a chunk list managing unit to insert a list of chunks transmitted from the data server into a chunk list pool and determine an arrangement method of the chunk list pool, and a chunk fetching unit to fetch available chunk information from the chunk list pool. The data server includes a receiving unit to receive request for chunk allocation from the metadata server, a chunk allocating unit to allocate chunks in response to the request for chunk allocation and write a list of chunks based on information about the allocated chunk, and a transmitting unit to transmit the list of chunks to the metadata server.

17 Claims, 9 Drawing Sheets

(58) Field of Classification Search
USPC .......................................... 707/822; 711/112
See application file for complete search history.

(56) References Cited

U.S. PATENT DOCUMENTS

| | | |
|---|---|---|
| 2010/0161897 A1* | 6/2010 | Lee .................. G06F 3/061 |
| | | 711/112 |
| 2011/0153606 A1 | 6/2011 | Kim et al. |
| 2012/0233417 A1 | 9/2012 | Kalach et al. |
| 2013/0103708 A1* | 4/2013 | Kim .............. G06F 17/30203 |
| | | 707/758 |
| 2015/0163157 A1 | 6/2015 | Hao et al. |
| 2015/0269239 A1 | 9/2015 | Swift et al. |

FOREIGN PATENT DOCUMENTS

| | | |
|---|---|---|
| KR | 10-2010-0073152 A | 7/2010 |
| KR | 10-2013-0045159 A | 5/2013 |
| KR | 10-2014-0006945 | 1/2014 |
| KR | 10-2014-0006945 A | 1/2014 |

OTHER PUBLICATIONS

KIPO Notice of Allowance dated Aug. 1, 2019 of the KR Patent Application No. 10-2016-0001055 corresponding to the above identified US Application.

* cited by examiner

DISTRIBUTED FILE SYSTEM AND METHOD OF CREATING FILES EFFECTIVELY

CROSS-REFERENCE TO RELATED APPLICATION

This application claims priority to and the benefit of Korean Patent Application No. 10-2016-0001055, filed Jan. 5, 2016, the disclosure of which is incorporated herein by reference in its entirety.

BACKGROUND

1. Field of the Dislosure

The present invention relates to a distributed file system and an execution method thereof, and more particularly, to a system and a method for effectively creating a file by partitioning a large-scale file volume into chunks each of which has a predetermined size and storing the partitioned chunks in a distributed file system.

2. Discussion of Related Art

In recent years, a distributed file system has been applied to the field of computing in which a small number of metadata servers are connected to a plurality of data servers via a network.

The metadata server stores metadata, such as the name of a file, a time of creating the file, and information about a location where actual data of the file is stored, and the data server stores actual data of the file in a distributed manner.

A large-scale file volume is partitioned into chunks of a predetermined size and stored in a distributed file system in a distributed manner, so that the large-scale file volume is effectively stored in a plurality of servers and the availability of file processing is enhanced.

In order to store file data in a distributed file system, an empty chunk is allocated to a data server which is selected by a metadata server, and the file data is written in the chunk.

When a device or network failure occurs during allocation of chunks as part of a process of storing files in a distributed file system, the allocated chunk is not returned and related tasks may be slowed down and a communication socket may be blocked.

In detail, during execution of an input/output operation with respect to a file in a distributed file system, a metadata server may request a data server to perform a certain operation if necessary, and the data server may execute the operation requested by the metadata server and return a result of a calculation to the metadata server. For example, when the metadata server requests the data server to allocate a new chunk and the data server fails to return a result value, the speed of storing a file is reduced and data integrity may not be maintained.

In addition, when a metadata server processes metadata-related operations in transactions while executing a transaction, the metadata server may request a data server to perform an operation, such as allocating of an empty chunk, and a result of the operation may not be returned, which may not allow the transaction of the metadata server to be terminated in a short period of time. In other words, resources (e.g. sockets) of the metadata server may be blocked because of a network failure.

As an example, a method for selecting a storage node and a storage device based on a query and a reply is suggested in a U.S. patent application of Amazon Technologies, Inc. (application Ser. No. 14/733,887, Publication No. US 2015/0269239) in which a data is divided to form partitions in a distributed storage environment; respective partitions are stored in distributed storage nodes, and respective partition replicas are also in the distributed storage nodes.

As another example, a method for allocating and migrating resources in a distributed environment is provided in a U.S. patent application of Alcatel Lucent USA Inc. (application Ser. No. 14/100,081, Publication No. 2015/0163157) in which a resource allocation parameter and a resource migration parameter are included in a resource request in order to allocate and migrate cloud resources in a distributed cloud system, and information for specifying a subject and position of cloud resource allocation and a location to and from which resources are migrated are provided in response to the parameters.

However, the above-described technologies do not disclose a method of effectively performing interaction between machines connected in a distributed file system via a network while having the above-described constraints.

SUMMARY OF THE DISCLOSURE

The present invention is directed to technology for a distributed file system capable of effectively creating files, and an execution method thereof.

The present invention is directed to technology in which, while writing data in a distributed file system, selecting of a data server to which a new chunk is allocated and allocating of an empty chunk to the selected data server are effectively performed in a cost-effective manner so that files are rapidly stored and data integrity is maintained.

The present invention is directed to technology capable of preventing blocking when a transaction of a metadata server is not terminated in a short period of time.

The technical objectives of the inventive concept are not limited to the above disclosure; other objectives may become apparent to those of ordinary skill in the art based on the following descriptions.

To achieve the above-described objectives, a distributed file system 100 according to the present invention includes one or more metadata servers 200 and one or more data servers 300, The metadata server 200 according to the present invention includes a chunk allocation determining unit 205 configured to determine whether to request that a data server 300 perform chunk allocation, a selecting unit 210 configured to select a data server 300 from the one or more data servers 300, a chunk allocation requesting unit 220 configured to request that the selected data server 300 perform chunk allocation, a chunk list managing unit 230 configured to insert a list of chunks 710 transmitted from the data server 300 into a chunk list pool 720 and determine an arrangement method of the chunk list pool, and a chunk fetching unit 240 configured to fetch available chunk information 730 from the chunk list pool 720.

The data server 300 according to the present invention includes a receiving unit 310 configured to receive a request for chunk allocation from the metadata server 200, a chunk allocating unit 320 configured to allocate a plurality of chunks in response to the request for chunk allocation and write the list of chunks 710 based on information about the allocated chunk, and a transmitting unit 330 configured to transmit the list of chunks 710 to the metadata server 200.

An execution method of the metadata server 200 according to the present invention includes: determining whether to request that a data server perform chunk allocation (S405); selecting at least one data server 300 from a plurality of data servers 300 (S410); requesting that the selected data server 300 allocate a plurality of chunks (S420); inserting, by the metadata server, a list of chunks 710 transmitted from the data server 300 into a chunk list pool 720 and determining an arrangement method of the chunk list pool 720 (S440); and fetching available chunk information 730 from the chunk list pool 720 (S450).

The execution method of the metadata server 200 may include transmitting the available chunk information 730 fetched from the chunk list pool 720 to an external client 10.

An execution method of the data server 300 according to the present invention includes: receiving a request for chunk allocation from a metadata server 200 (S510); allocating a plurality of chunks in response to the request for chunk allocation (S520) and writing a list of chunks 710 based on information about the allocated chunks (S530); and transmitting the list of chunks 710 to the metadata server 200 (S540).

An execution method of the distributed file system 100 according to the present invention includes: selecting at least one data server 300 from a plurality of data servers 300 (S410); requesting that the selected data server 300 allocate a plurality of chunks (S420); inserting, by the metadata server 200, a list of chunks 710 transmitted from the data server 300 into a chunk list pool 720 and determining an arrangement method of the chunk list pool 720 (S440); fetching available chunk information 730 from the chunk list pool 720 (S450); allocating at least one chunk in response to the request for chunk allocation (S520) and writing the list of chunks 710 based on information about the allocated chunk (S530); and transmitting the list of chunks 710 to the metadata server 200 (S540).

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

The above objects and other advantages, and a scheme for the advantages of the present invention should become readily apparent by reference to the following detailed description when considered in conjunction with the accompanying drawings. However, the scope of the present invention is not limited to such embodiments and the present invention may be realized in various forms. The embodiments to be described below are merely exemplary embodiments provided to fully disclose the present invention and assist those skilled in the art to completely understand the present invention, and the present invention is defined only by the scope of the appended claims. The specification drafted as such is not limited to detailed terms suggested in the specification. The terminology used herein is for the purpose of describing particular embodiments only and is not intended to be limiting of the disclosure. As used herein, the singular forms "a", "an" and "the" are intended to include the plural forms as well, unless the context clearly indicates otherwise. It should be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Hereinafter, exemplary embodiments of the present invention will be described in detail with reference to the accompanying drawings.

Figure 1:
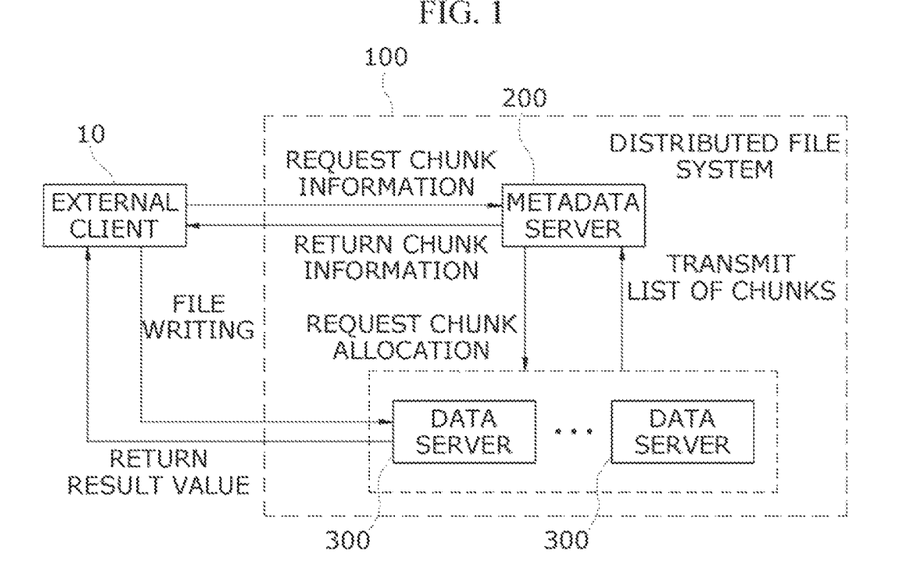
FIG. 1 is a block diagram illustrating a configuration of an overall system including an external client.

FIG. 1 is a block diagram illustrating a configuration of an overall system including an external client.

A distributed file system 100 including one or more metadata servers 200 and one or more data servers 300 is seen as a single storage medium from a view point of an external client 10. The external client 10 receives a list of chunks 710 of the data server 300 in which a file is stored from the metadata server 200, and directly connects to the data server 300 and performs writing. Information about individual chunks included in the list of chunks 710 includes an address of the data server 300 for storage, the number of disks and a chunk index.

When two or more metadata servers 200 are provided, a single master metadata server 200 and one or more slave metadata servers 200 may be included. When chunk information 730 is requested from the master metadata server, the master metadata server may select an appropriate slave metadata server in consideration of a metadata server status such that the client connects to the metadata server and obtains the chunk information. Alternatively, the system may be configured such that the master server not to be functioned as a metadata serve may be provided separately from the metadata server.

Although the storing of a file may be achieved via the metadata server without directly connecting to the data server 300, in order to prevent heavy load concentrated on the metadata server, the external client 10 may directly connect to the data server 300 by using the address of the data server and the chunk index included in the chunk information 730 and store a file, and when the storing of the file is completed, return a result of the file storing to the metadata server 200, and the metadata server 200 reflects the result of the file storing on metadata.

Figure 2:
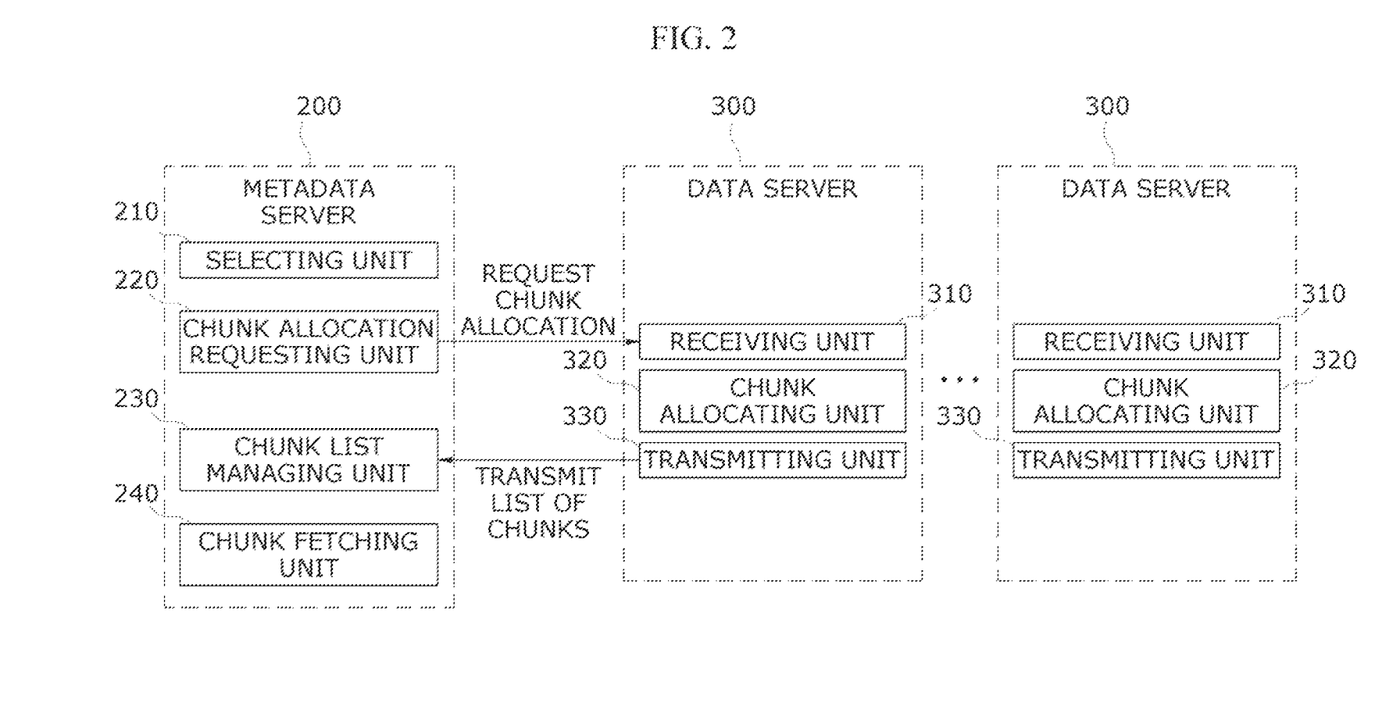
FIG. 2 is a block diagram illustrating a configuration of a distributed file system.

FIG. 2 is a block diagram illustrating a configuration of the distributed file system 100.

Figure 3:
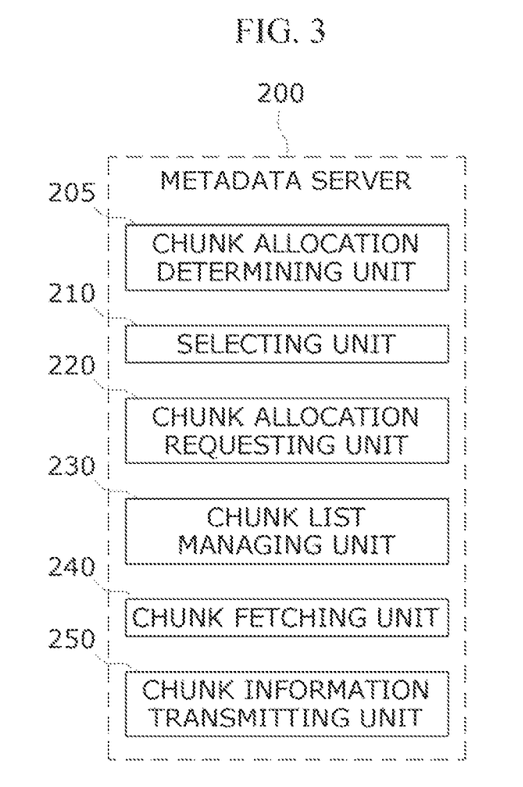
FIG. 3 is a block diagram illustrating a configuration of a metadata server.

FIG. 3 is a block diagram illustrating the metadata server 200.

The metadata server 200 according to an embodiment of the present invention includes a selecting unit 210 configured to select a data server from the one or more data servers 300, a chunk allocation requesting unit 220 configured to request that the selected data server 300 perform chunk allocation, a chunk list managing unit 230 configured to insert a list of chunks 710 transmitted from the data server 300 into a chunk list pool 720 and determine an arrangement method of the chunk list pool 720, and a chunk fetching unit 240 configured to fetch available chunk information from the chunk list pool 720. The chunk allocation requesting unit 220 of the metadata server 200 sends a request for chunk allocation to a receiving unit 310 of the data server, and a transmitting unit 330 of the data server 300 transmits the list of allocated chunks 710 to the metadata server 200.

In addition, the metadata server 200 may further include a chunk information transmitting unit 250 that transmits the chunk information 730 to the external client 10.

In addition, the chunk list managing unit 230 may randomly arrange the order of chunks in the chunk list pool 720. Since chunks are fetched according to the randomly arranged order of the chunks, files may be stored in a distributed manner.

In addition, the chunk list managing unit 230 may create a list of chunks by ordering chunks by sources. When storing a single file, the single file may be stored in a single data server, and when storing a plurality of files, different data servers are selected for respective files and the plurality of files are stored in a distributed manner. To this end, the chunk list pool 720 is built according to sources of the data servers so that effective storage may be achieved.

In addition, the chunk fetching unit 240 may fetch the chunk information 730 based on a distance between the external client 10 and a location in which a chunk is actually stored. When a network of the data server 300 is set, an IP address, that is, a logical address, is set according to an actual physical distance (a concept correlated with network speed and determined by the length of a network connection line, the number of switching devices passed, the distance between switching devices, and other network devices) so that the list of chunks 710 included in the closet data server 300 according to an IP address setting rule (for example, a data server having a highest network connection speed) is fetched and is transmitted to the external client 10. When an external client stores a file in chunks, the storing of the file in the closest network may be beneficial in file storage performance. Accordingly, when a plurality of external clients use the distributed file system 100 according to the present invention, file distribution efficiency and file storage performance may be improved.

In addition, the metadata server 200 may further include a chunk allocation determining unit 205.

When the chunk list pool 720 has chunks in a number large enough to store a file, the chunk allocation determining unit 205 may allow the chunk fetching unit 240 to fetch the chunk information 730 from the chunk list pool 720 immediately upon a request of the external client 10 for chunk information without allocating the chunks.

In addition, When the chunk list pool 720 has chunks in a number less than a reference value, the chunk allocation determining unit 205 may periodically request that the data server 300 perform chunk allocation such that the number of chunks in the chunk list pool 720 is maintained at a reference number or above, or may request the data server 300 to perform chunk allocation in response to a command of a user such that the number of chunks in the chunk list pool 720 is increased.

The reference number may be properly set according to the number of data servers 300, the number and capacity of disks included in the data servers 300, and a memory capacity of the metadata server 200.

For example, when it is assumed that an average file to be stored has a size of about 1 GB (1,000,000,000 Bytes), a chunk has a size of 64 MB (64/000,000 Bytes), and the number of data servers 300 is 100, 16 chunks are needed to store a single file. Accordingly, each data server 300 may be provided to have 150 chunks, that is, about 10 GB (corresponding to a capacity for about 10 files), and the metadata server 200 may be provided to have a chunk number of 15,000 in the chunk list pool 720 in proportion to the number of the data servers 300. The chunk list pool 720 may be provided in two or more chunk list pools to separately manage currently used chunks from available chunks, and a reference value may be set corresponding to the number of available chunks. When the reference value is set to 15,000, the maximum number of chunks included in the chunk list pool 720 is set to two or three times the reference value, and when the number of available chunks is equal to or less than the reference value, a request for allocating chunks corresponding to the reference value or two times the reference value is made to fill the chunk list pool 720 with available chunks.

Figure 4:
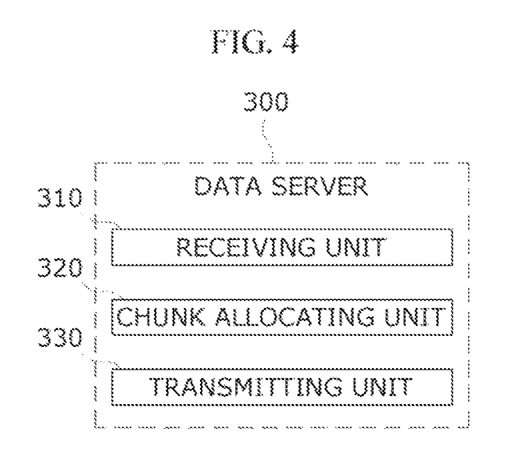
FIG. 4 is a block diagram illustrating a configuration of a data server.

FIG. 4 is a block diagram illustrating a configuration of the data server 300.

The data server 300 according to an exemplary embodiment of the present invention includes a receiving unit 310 to receive a request for chunk allocation from the metadata server 200, a chunk allocating unit 320 to allocate a plurality of chunks in response to the request for chunk allocation and write the list of chunks 710 based on information about the allocated chunks, and a transmitting unit 330 to transmit the list of chunks 710 to the metadata server 200.

The data server 300 according to another exemplary embodiment of the present invention may pre-allocate chunks and manage the list of allocated chunks 710, and when the number of chunks is equal to or less than the reference value (for example, 150 for each data server) as a result of a periodic determination, chunks are additionally allocated and when a request for chunk allocation is sent from the metadata server 200, the data server 300 may immediately return the list of chunks 710 that is currently allocated and managed without allocating new chunks, and thus the metadata server 200 may obtain the list of chunks 710 immediately after requesting chunk allocation. The list of chunks 710 which is emptied may be periodically filled to reach the reference value or more.

The chunk allocating unit 320 of the data server 300 may include a function which allocates chunks when the number of available chunks is less than the reference value such that the number of available chunks is maintained at the reference value or more.

When the number of available chunks is equal to or larger than the reference value, the chunk allocating unit 320 of the data server 300 fetches chunks from the list of the available chunks 710 without allocating chunks, and transmits the list of chunks 710 to the metadata server 200.

Accordingly, when the number of available chunks is less than the reference value, the data server 300 may allocate chunks immediately after chunks are used so that the number of available chunks is maintained at the reference value or more, or may allocate chunks according to an execution of a scheduler so that the number of available chunks is maintained to the reference value or more.

Immediately after the data server 300 transmits the list of chunks 710 to the metadata server 200, the external client 10 connects the data server 300 to perform file writing process. During a file writing process in a certain data server 300, chunk allocation of the certain data server 300 may not be allowed.

Figure 5:
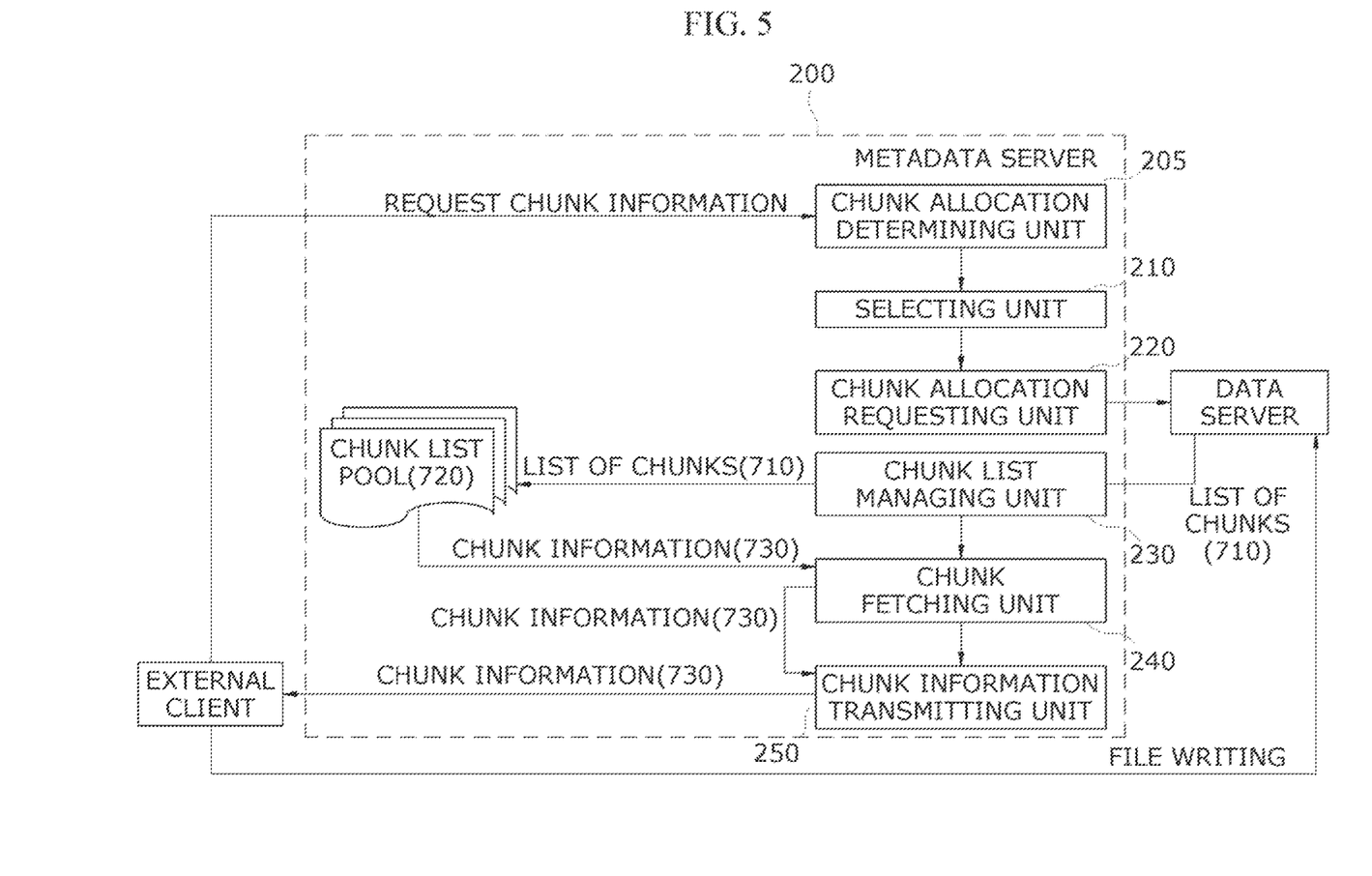
FIG. 5 is a diagram showing an execution method of a metadata server when available chunks are insufficient.

FIG. 5 is a diagram showing a process of storing a file by additionally allocating empty chunks when the number of chunks included in the chunk list pool is insufficient to store the file.

The metadata server 200 according to an exemplary embodiment of the present invention requests that the data server 300 allocate a required number of chunks when there are insufficient available chunks, receives a list of allocated chunks, inserts the received list of allocated chunks into the chunk list pool 720, and fetches chunk information from the chunk list pool 720.

In this case, the metadata server 200 may request that the data server 300 allocate: chunks more than the required number, and when an external client requests a new file storage, the metadata server 200 may fetch the chunk information 730 about the remaining chunks from the chunk list pool 720 without requesting chunk allocation. For example, when a chunk size is 64,000,000 bytes (64 MB) and a file of 2,000,000,000 bytes (2 GB) is stored, the number of required chunks is 32 (2,000,000,000/64,000,000=31.25), but the chunk allocation requesting unit may request 64 chunks to be allocated (that is, two times the required number of 32). In this case, 32 chunks may be immediately used for storing the file, and the remaining 32 chunks may be used when a subsequent new file storage request is received.

Figure 6:
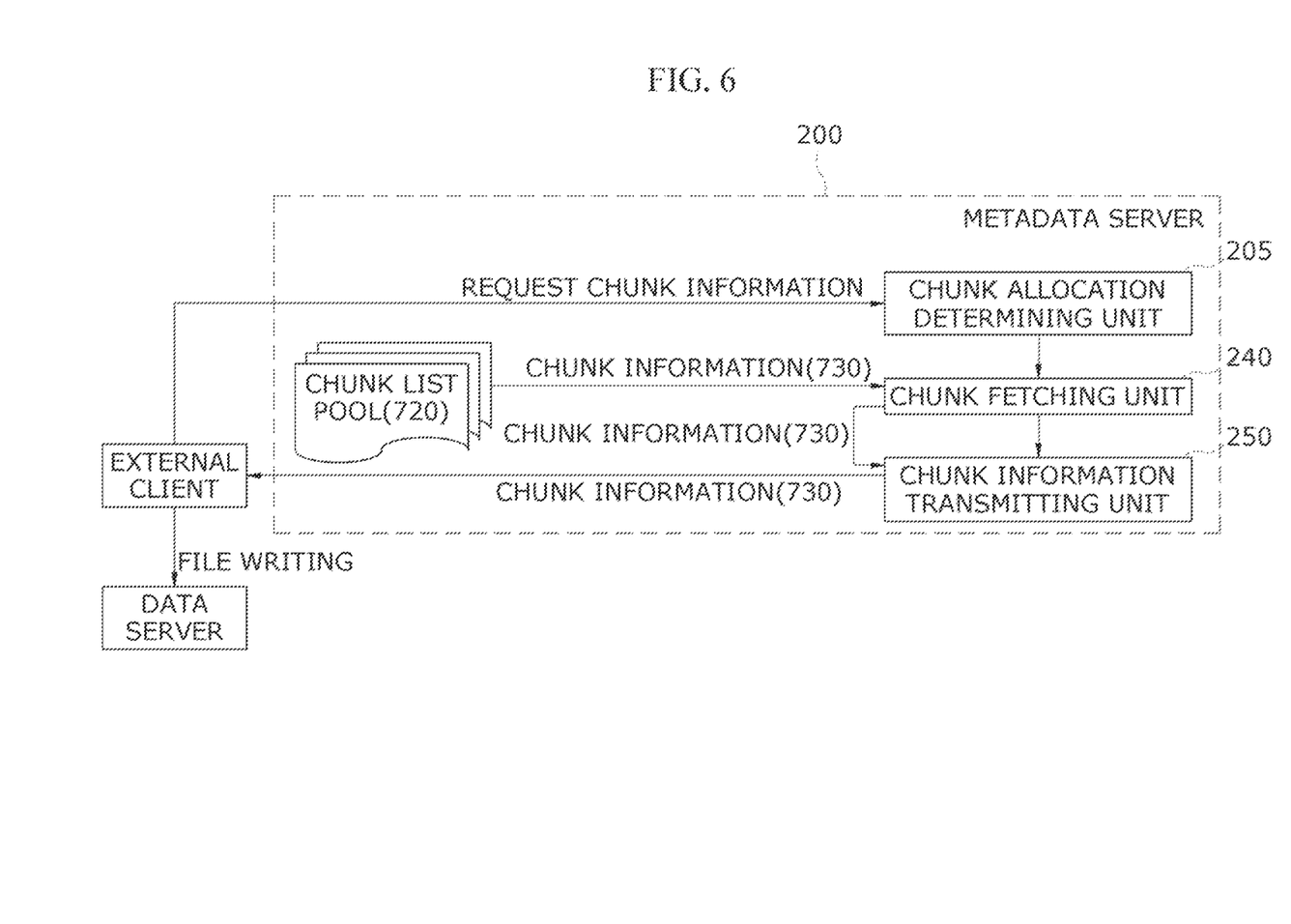
FIG. 6 is a diagram showing an execution method of a metadata server when available chunks are sufficient.

FIG. 6 is a flow chart showing an available chunk list according to an exemplary embodiment of the present invention from which chunks (a chunk) may immediately be fetched when an external client requests chunk information.

When the number of chunks in the chunk list pool 720 is sufficiently large in comparison to a size of a file that is requested to be stored, the metadata server 200 fetches available chunk information 730 from the chunk list pool 720 without requesting that the data server 300 allocate chunks, and returns the chunk information 730 to the external client 10.

As an example, when a chunk has a size of 64 MB, 100 available chunks exist in the chunk list pool 720 and the external client requests a file of 1 GB to be stored, 16 chunks are needed (1,000,000,000/64,000,000=15.625). In this case, the metadata server fetches 16 pieces of the chunk information 730 from the chunk list pool 720 and instantly transmits the fetched chunk information 730 to the external client, so that the number of the available remaining chunks in the chunk list pool 720 is 84. As another example, when a file of 7 GB is requested to be stored, the number of required chunks is 110, and the number of available chunks is insufficient by 10 chunks. Accordingly, the metadata server 200 requests the data server 300 to allocate chunks according to the procedure shown in FIG. 5, and transmits the allocated chunk information 730 to the external client 10.

Figure 7A:
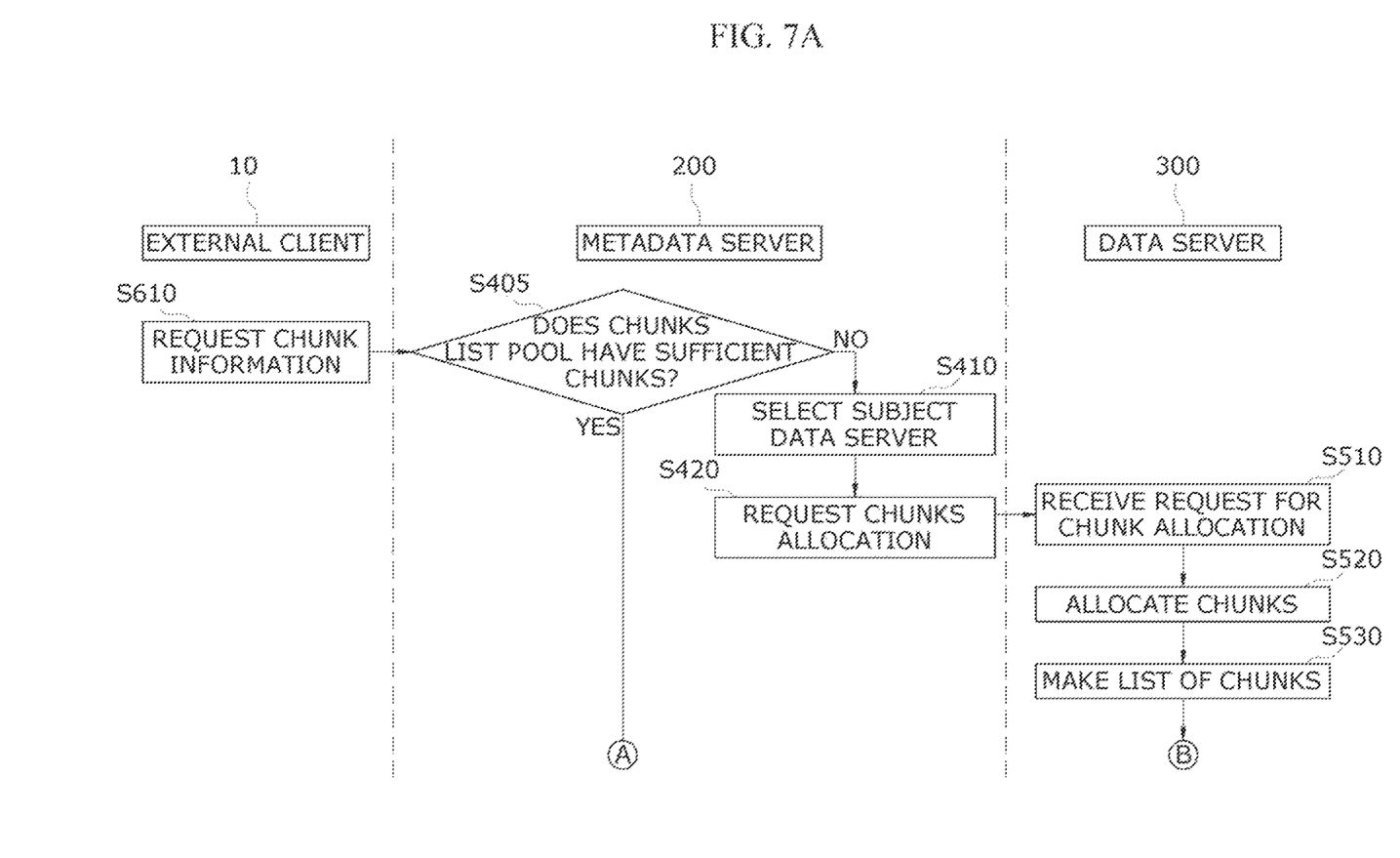
FIG. 7A and FIG. 7B are flowcharts showing a process of storing a file in a distributed file system including an external client.
Figure 7B:
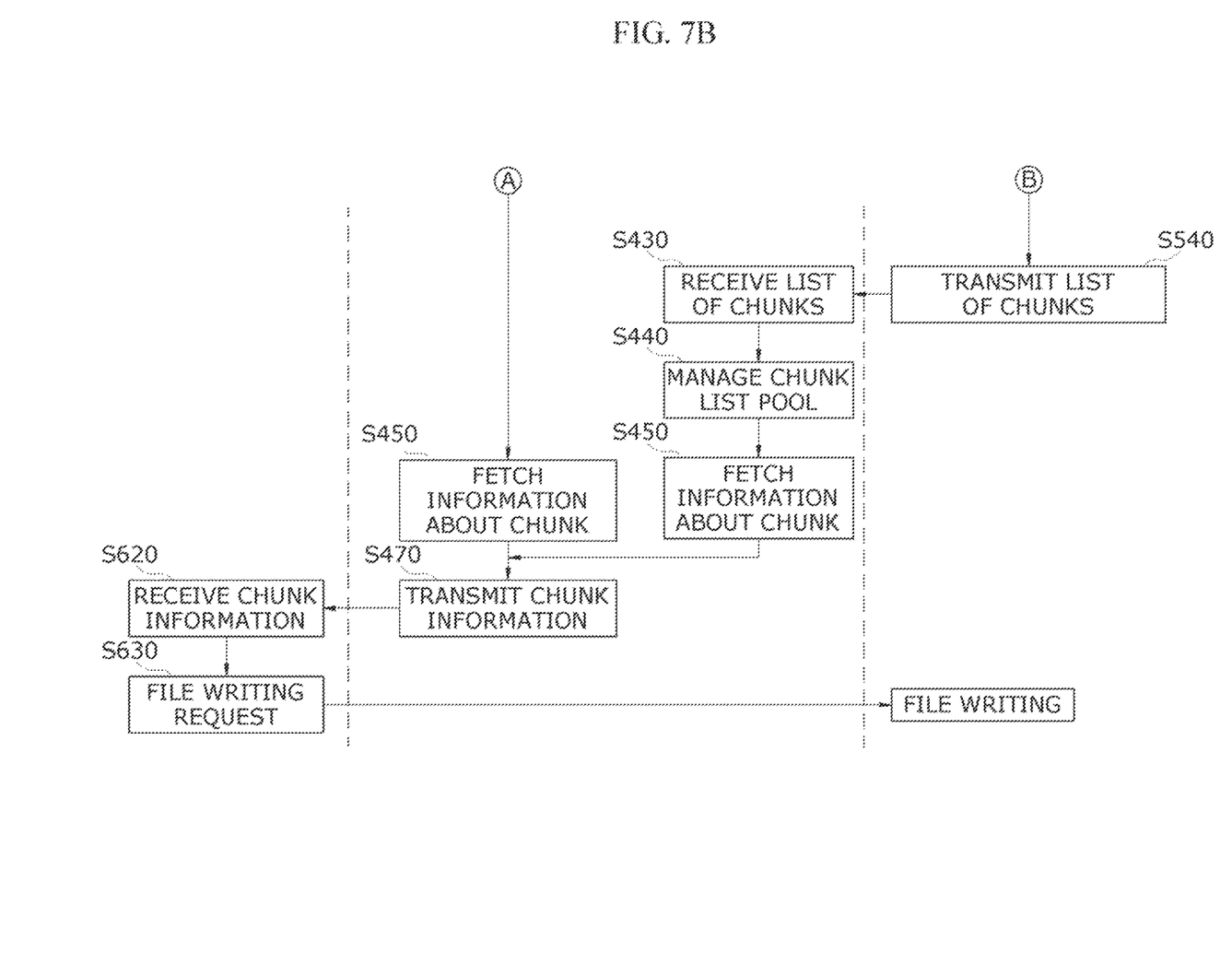

FIG. 7A and FIG. 7B are flowcharts showing an overall control flow of the distributed file system 100 including the external client 10.

An execution method of the distributed file system 100 according to an exemplary embodiment of the present invention may include determining, by the metadata server 200, whether to request chunk allocation depending on whether the number of available chunks in the chunk list pool 720 is sufficient to store a file (S405), selecting, by the metadata server 200, at least one data server 300 from a plurality of data servers 300 (S410), requesting, by the metadata server 200, that the selected data server 300 allocate a plurality chunks (S420), receiving, by the data server 300, the request for chunk allocation (S510), allocating, by the data server 300, at least one chunk in response to the request for chunk allocation made in operation S420 (S520), making, by the data server 300, a list of chunks 710 based on the allocated chunks (S530), transmitting, by the data server 300, the list of chunks 710 to the metadata server 200 (S540), receiving, by the metadata server 200, the list of chunks 710 from the data server 300 (S430), inserting, by the metadata server 200, the list of chunks 710 into the chunk list pool 720 and determining an arrangement order of the chunk list pool (S440), and fetching, by the metadata server 200, available chunk information 730 from the chunk list pool 720 (S450).

In this case, the method may further include requesting, by the external client 10, that the metadata server 200 provide chunk information 730 including information about the data server 300 to store a file (S610), and transmitting, by the metadata server 200, the chunk information 730 fetched from the chunk list pool 720 to the external client (S470).

According to another exemplary embodiment of the present invention, an execution method of the metadata server 200 may include determining, by the metadata server 200, whether to request chunk allocation depending on whether the number of available chunks in the chunk list pool 720 is sufficient to store a file (S405), selecting, by the metadata server 200, at least one data server 300 from a plurality of data servers 300 (S410), requesting, by the metadata server 200, that the selected data server 300 allocate a plurality chunks (S420), inserting, by the metadata server 200, a list of chunks transmitted from the data server 300 which received the request for chunk allocation into the chunk list pool 720 and determining an arrangement order of the chunk list pool (S440), and fetching, by the metadata server 200, information about available chunks from the chunk list pool 720 (S450).

In addition, the execution method of the metadata server 200 may further include receiving a request for chunk information 730 from the external client 10 (S610), and transmitting the chunk information 730 fetched from the chunk list pool 720 to the external client 10 (S470).

Each of the above described operations may be executed in the form of a thread.

In addition, in operation S440 of determining the arrangement method of the chunk list pool 720, an arrangement order of the chunk list pool 720 may be randomly determined.

In addition, in operation S440 of determining the arrangement method of the chunk list pool 720, an arrangement order of the chunk list pool 720 may be determined by their source.

In addition, in operation S450 of fetching chunk information, the chunk information may be fetched based on a distance between an external client and a location at which a chunk is actually stored.

In addition, when the number of available chunks in the chunk list pool 720 is equal to or larger than a number needed for a file storage request, the available chunk information 730 may be fetched from the chunk list pool 720 without requesting that the data server 300 allocate chunks.

In addition, when the number of available chunks in the chunk list pool 720 is less than the number needed for the file storage request, the available chunk information 730 may be made in advance by requesting that the data server 300 allocate chunks.

According to another exemplary embodiment of the present invention, an execution method of the data server 300 includes receiving a request for chunk allocation from the metadata server 200 (S510), allocating a plurality of chunks in response to the request for chunk allocation (S520), writing a list of chunks 710 based on the allocated chunks S530, and transmitting the list of chunks 710 to the metadata server 200 (S540).

In an execution method of the data server 300 according to another exemplary embodiment of the present invention, chunks are pre-allocated to generate a list of pre-allocated chunks 710, and when the number of chunks included in the list 710 is less than a reference value (for example, 150 for each data server) as a result of a periodic determination, chunks are additionally allocated and the chunks are inserted into the list 710, and when a request for chunk allocation (S420) is received from the metadata server 200 (S510), the list of chunks 710 currently being allocated and managed is returned immediately without allocating new chunks, and the metadata server 200 may obtain the list of chunks 710 immediately after requesting chunk allocation. The list of chunks 710 which is emptied may be periodically filled to reach the reference value or more.

Figure 8:
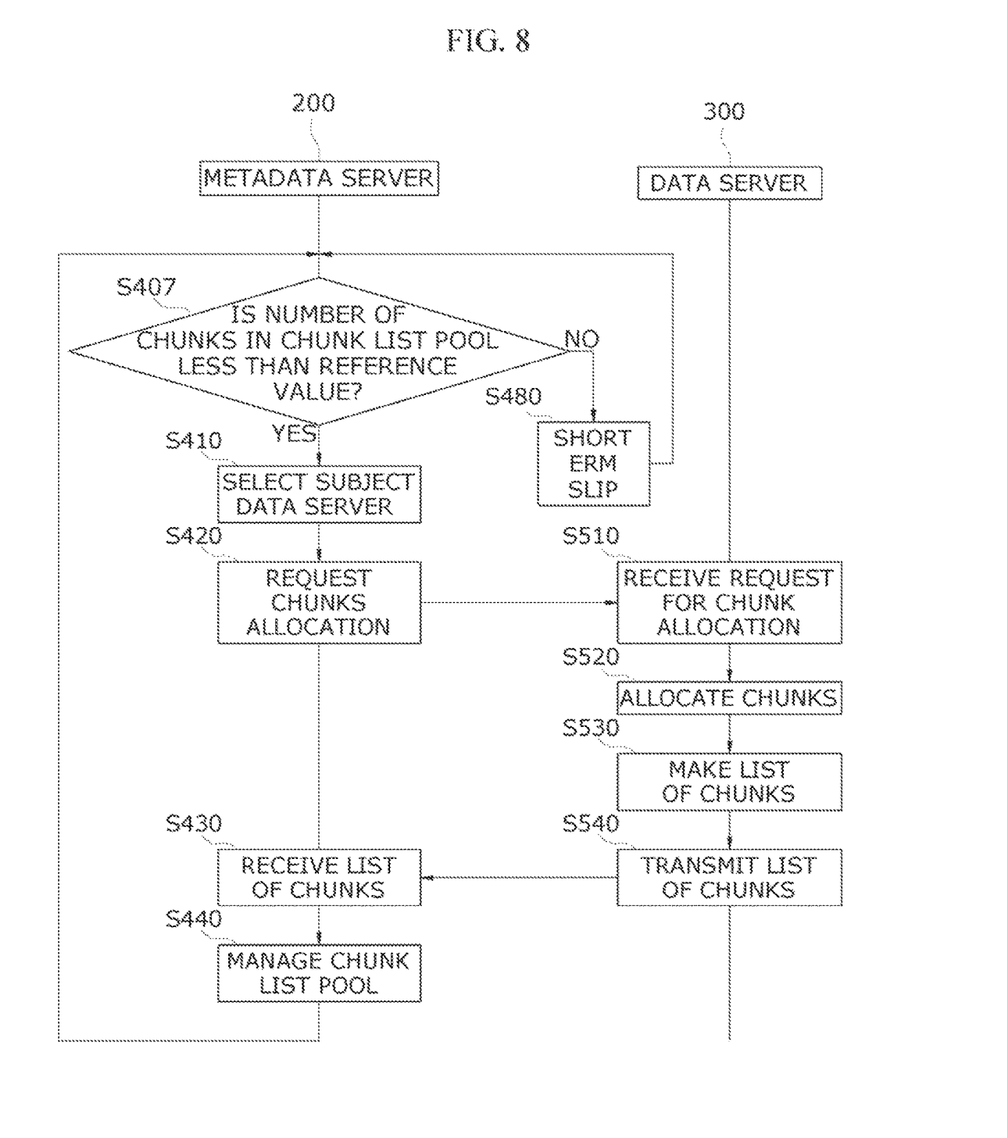
FIG. 8 is a flowchart showing a process of periodically allocating chunks in a distributed file system.

FIG. 8 is a flowchart showing an execution method of the distributed file system 100 periodically allocating chunks when the number of available chunks is insufficient in the distributed file system 100. A procedure flow shown is a flow of periodically requesting that the data server 200 allocates chunks when the number of chunks in the chunk list pool 720 is below a reference value.

The execution method of the distributed file system 100 according to an exemplary embodiment of the present invention includes periodically requesting that the data server 300 allocate chunks such that the number of chunks in the chunk list pool 720 is maintained to be equal to or greater than the reference value in order to ensure that the number of chunks is at the references value or above regardless of chunk information that is requested by the external client 10. Since the present invention is provided to prevent risks caused when chunk allocation is requested during storing a file, the data server is periodically requested to allocate chunks when the number of chunks in the chunk list pool is less than the reference value even when there is no request for storing a file so that the number of available chunks in the chunk list pool is maintained at the reference value or above and thus the available chunks are may be secured in advance.

An exemplary embodiment of a part of the execution method of the distributed file system 100 according to the present invention includes periodically determining whether the number of available chunks in the chunk list pool of the metadata server 200 is less than a reference value (S407), selecting, by the metadata server 200, at least one data server 300 from a plurality of data servers 300 (S410), requesting, by the metadata server 200, that the selected data server 300 allocate a plurality of chunks (S420), receiving, by the data server 300, the request for chunk allocation (S510), allocating, by the data server 300, at least one chunk in response to the request for chunk allocation made in operation S420 (S520), writing, by the data server 300, a list of chunks 710 based on the allocated chunks (S530), transmitting, by the data server 300, the list of chunks 710 to the metadata server 200 (S540), receiving, by the metadata server 200, the list of chunks 710 from the data server 300 (S430), and inserting, by the metadata server 200, the list of chunks 710 into the chunk list pool 720 and determining an arrangement order of the chunk list pool (S440).

An exemplary embodiment of a part of the execution method of the distributed file system 100 according to the present invention includes periodically determining whether the number of available chunks in the chunk list pool of the metadata server 200 is less than the reference value (S407), selecting, by the metadata server 200, at least one data server 300 from the plurality of data servers 300 (S410), requesting, by the metadata server 200, that the selected data server 300 allocate a plurality chunks (S420), receiving, by the metadata server 200, the list of chunks 710 from the data server 300 (S430), and inserting, by the metadata server 200, the list of chunks 710 into the chunk list pool 720 and determining an arrangement order of the chunk list pool (S440).

Figure 9:
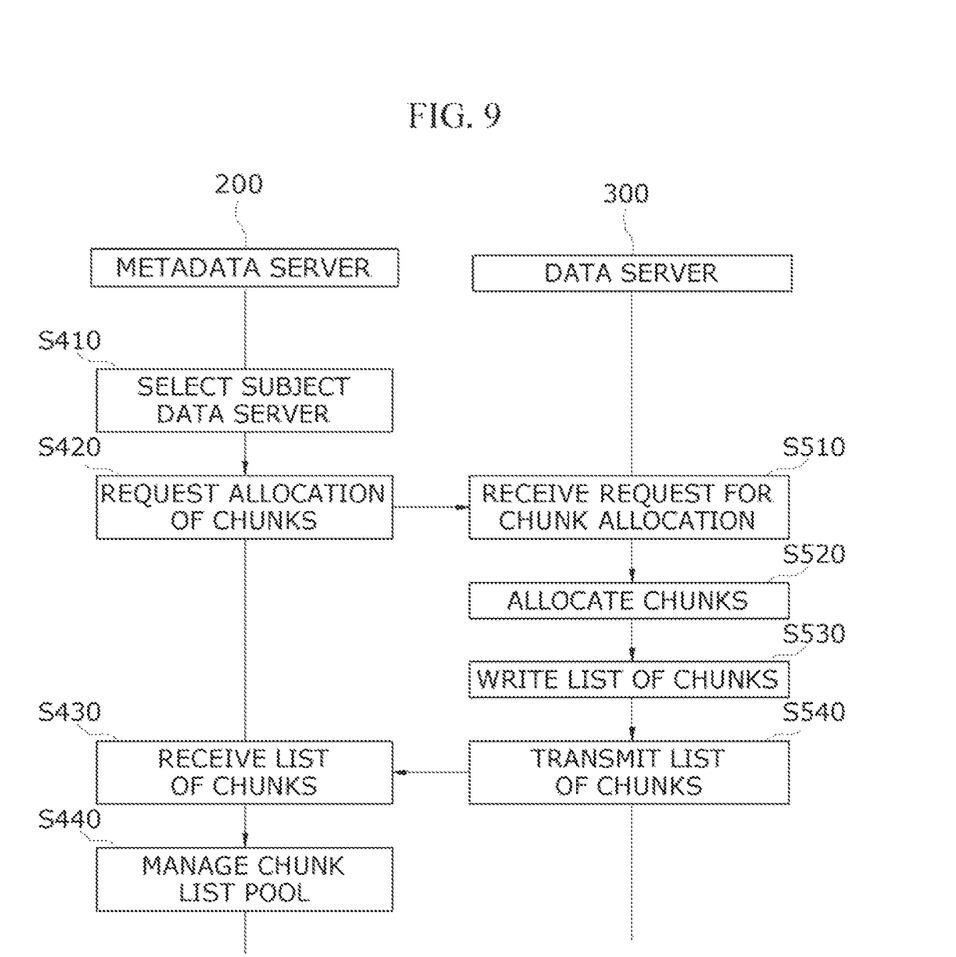
FIG. 9 is a flowchart showing a process of allocating chunks in a distributed file system according to a command of a user.

FIG. 9 is a flowchart showing an execution method of the distributed file system 100, in detail, a process of pre-allocating chunks according to a command of a user.

The execution method of the distributed file system 100 according to an exemplary embodiment of the present invention includes securing required available chunks in advance by requesting that the data server 300 allocate chunks in response to a command of a user. This process is performed regardless of an external client's request for storing a file. Since the allocating of chunks is a process demanding a heavy load, chunks are not allocated whenever a file is stored but chunks are periodically pre-allocated according to a predetermined rule so that the pre-allocated chunks are used immediately when a request for storing a file is received.

In detail, an exemplary embodiment of a part of the execution method of the distributed file system 100 according to the present invention includes determining whether to request chunk allocation in response to a command of a user, selecting, by the metadata server 200, at least one data server 300 from a plurality of data servers 300 (S410), requesting, by the metadata server 200, that the selected data server 300 allocate a plurality chunks (S420), receiving, by the data server 300, the request for chunk allocation (S510), allocating, by the data server 300, at least one chunk in response to the request for chunk allocation made in operation S420 (S520), writing, by the data server 300, a list of chunks 710 based on the allocated chunks (S530), transmitting, by the data server 300, the list of chunks 710 to the metadata server 200 (S540), receiving, by the metadata server 200, the list of chunks 710 from the data server 300 (S430), and inserting, by the metadata server 200, the list of chunks 710 into the chunk list pool 720 and determining an arrangement order of the chunk list pool (S440).

An exemplary embodiment of a part of the execution method of the metadata server 200 according to the present invention includes determining whether to request chunk allocation in response to the command of the user selecting, by the metadata server 200, at least one data server 300 from the plurality of data servers 300 (S410), requesting, by the metadata server 200, that the selected data server 300 allocate a plurality chunks (S420), receiving, by the metadata server 200, the list of chunks 710 from the data server 300 (S430), and inserting, by the metadata server 200, the list of chunks 710 into the chunk list pool 720 and determining an arrangement order of the chunk list pool (S440).

Each of the above described operations in the execution method of the distributed file system 100, the execution method of the metadata server 200 and the execution method of the data server 300 may be executed in the form of a thread.

As is apparent from the above, since a result of interacting with other servers connected via a network is prevented from being delayed when returned during metadata operations, the performance of the distributed file system can be improved. In addition, chunk information is rapidly returned in response to a request for chunk information, so that files can be stored at a high speed and data integrity can be maintained.

Although the present invention has been described above, it should be understood that there is no intent to limit the present invention to the particular forms disclosed, but on the contrary, the disclosure is to cover all modifications, equivalents, and alternatives falling within the spirit and scope of the disclosure. Therefore, the exemplary embodiments disclosed in the present invention and the accompanying drawings are intended not to limit but to illustrate the technical spirit of the present invention, and the scope of the present invention is not limited by the exemplary embodiments and the accompanying drawings. The protective scope of the present invention shall be construed on the basis of the accompanying claims and it shall be construed that all of the technical ideas included within the scope equivalent to the claims belong thereto.

What is claimed is:

1. A metadata server comprising:
    a chunk allocation determining unit configured to determine whether or not to request a data server to perform chunk allocation, to thereby secure available chunks in a chunk list pool in advance of a shortage of the available chunks in the chunk list pool;
    a selecting unit configured to select a data server from one or more data servers;
    a chunk allocation requesting unit configured to request the selected data server to perform chunk allocation;
    a chunk list managing unit configured to insert a list of chunks transmitted from the data server into the chunk list pool and determine an arrangement order of the chunk list pool; and
    a chunk fetching unit configured to fetch information on the available chunks from the chunk list pool,
    wherein the chunk fetching unit is configured to fetch the available chunk information from the chunk list pool immediately upon a request of an external client for chunk information without requesting the data server to perform chunk allocation.

2. The metadata server of claim 1, further comprising a chunk information transmitting unit configured to transmit the information on available chunks from the chunk list pool to an external client.

3. The metadata server of claim 1, wherein the chunk list managing unit determines the arrangement order of the list of chunks in a random manner.

4. The metadata server of claim 1, wherein the chunk list managing unit determine the arrangement order of the list of chunks by sources of the data servers.

5. The metadata server of claim 1, wherein the chunk fetching unit fetches the available chunk information based on a physical distance between an external client and a location at which a chunk is actually stored.

6. The metadata server of claim 1, wherein the chunk allocation determining unit is configured to periodically request chunk allocation such that chunks in the chunk list pool are maintained at a number of a reference value or more when the chunk list pool has chunks in a number less than the reference value.

7. The metadata server of claim 1, wherein the chunk allocation determining unit is configured to request that a data server perform chunk allocation in response to a command of a user such that chunks in the chunk list pool are maintained at a number of a reference value or more when the chunk list pool has chunks in a number less than the reference value, and to maintain the number of chunks at a current state when the chunk list pool has chunks in a number of the reference value or more.

8. An execution method of a metadata server, the execution method comprising:
    determining whether or not to request a data server to perform chunk allocation, to thereby secure available chunks in a chunk list pool in advance of a shortage of the available chunks in the chunk list pool;
    selecting a data server from a plurality of data servers;
    requesting the selected data server to allocate a plurality of chunks;
    inserting, by the metadata server, a list of chunks transmitted from the data server into the chunk list pool and determining an arrangement order of the chunk list pool; and
    fetching information on the available chunks from the chunk list pool,
    wherein when the chunk list pool has available chunks in a number of a number needed for a file storage request or more, in the fetching of the available chunk information, the available chunk information is fetched from the chunk list pool immediately upon a request of an external client for chunk information without requesting a data server to allocate the plurality of chunks.

9. The execution method of claim 8, further comprising:
    receiving a request for chunk information from an external client; and
    transmitting the available chunk information fetched from the chunk list pool to the external client.

10. The execution method of claim 8, wherein in the determining of the arrangement order of the chunk list pool, the arrangement order of the chunk list pool is determined in a random manner.

11. The execution method of claim 8, wherein in the determining of the arrangement order of the chunk list pool, the arrangement order of the chunk list pool is determined by sources of data servers.

12. The execution method of claim 8, wherein in the fetching of the available chunk information, the chunk information is fetched based on a physical distance between an external client and a location at which a chunk is actually stored.

13. The execution method of claim 8, wherein in the requesting of the allocation of the plurality of chunks, chunk allocation is periodically requested such that chunks in the chunk list pool are maintained at a number of a reference value or more when the chunk list pool has chunks in a number less than the reference value.

14. The execution method of claim 8, wherein in the requesting of the allocation of the plurality of chunks, chunk allocation is requested in response to a command of a user such that chunks in the chunk list pool are maintained at a number of a reference value or more when the chunk list pool has chunks in a number less than the reference value, and the number of chunks at a current state is maintained when the chunk list pool has chunks in a number of the reference value or more.

15. An execution method of a distributed file system, the execution method comprising:
    determining, by a metadata server, whether or not to request a data server to perform chunk allocation, to thereby secure available chunks in a chunk list pool in advance of a shortage of the available chunks in the chunk list pool;
    selecting, by the metadata server, at least one data server from a plurality of data servers;

requesting, by the metadata server, that the selected data server allocate a plurality of chunks;

receiving, by the data server, the request for chunk allocation;

allocating, by the data server, at least one chunk in response to the request for chunk allocation, and writing a list of chunks based on information about the allocated chunk;

transmitting, by the data server, the list of chunks to the metadata server;

inserting, by the metadata server, the list of chunks transmitted from the data server into the chunk list pool and determining an arrangement order of the chunk list pool; and fetching, by the metadata server, information on the available chunks from the chunk list pool, wherein when the chunk list pool has available chunks in a number of a number needed for a file storage request or more, in the fetching of the available chunk information, the available chunk information is fetched from the chunk list pool immediately upon a request of an external client for chunk information without requesting a data server to allocate the plurality of chunks.

16. The execution method of claim 15, wherein in the requesting of the allocation of the plurality of chunks, chunk allocation is periodically requested such that chunks in the chunk list pool are maintained at a number of a reference value or more when the chunk list pool has chunks in a number less than the reference value.

17. The execution method of claim 15, wherein in the requesting of the allocation of the plurality of chunks, chunk allocation is requested in response to a command of a user such that chunks in the chunk list pool are maintained at a number of a reference value or more when the chunk list pool has chunks in a number less than the reference value, and the number of chunks at a current state is maintained when the chunk list pool has chunks in a number of the reference value or more.

* * * * *